March 20, 1945.    F. G. KELLY    2,372,002
TELEMETERING SYSTEM
Filed March 30, 1943
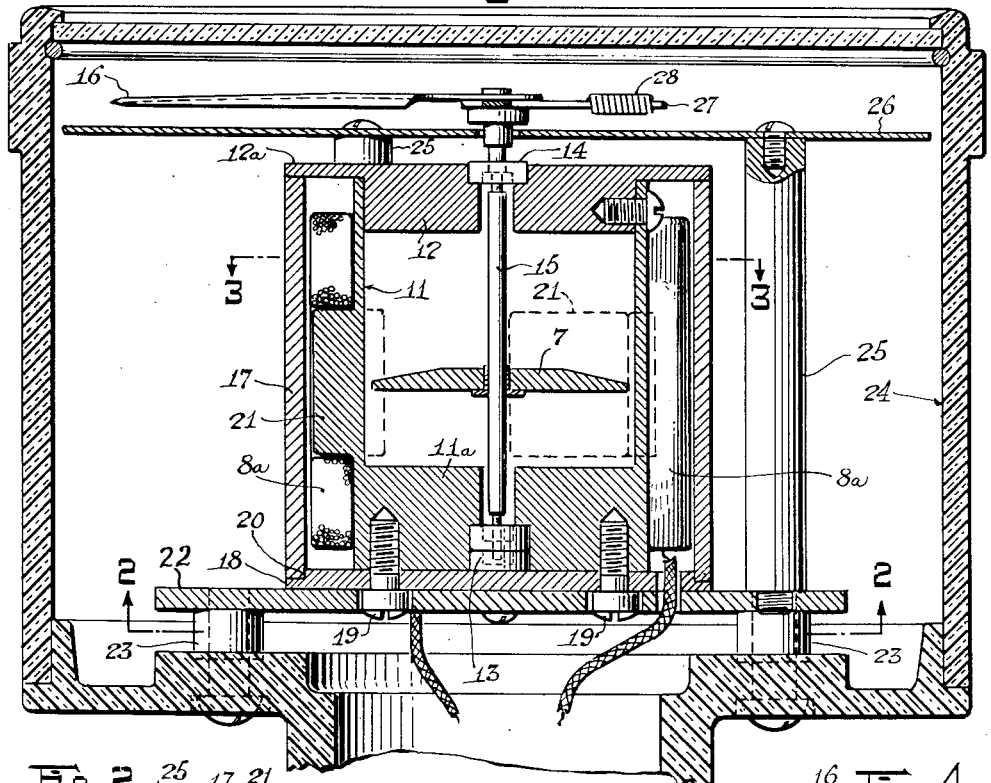
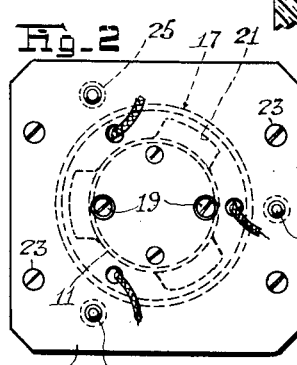
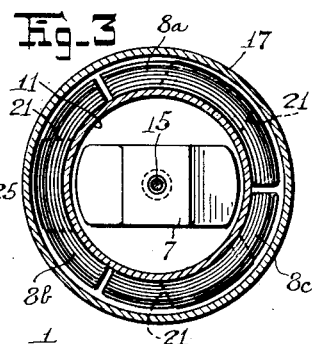
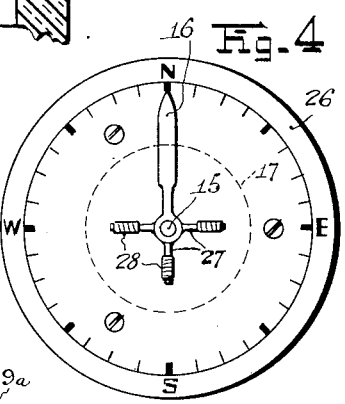
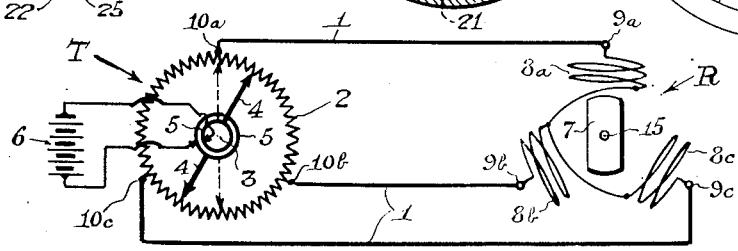
Inventor
FREDERICK G. KELLY
Henry Lanahan
Attorney Patented Mar. 20, 1945

2,372,002

UNITED STATES PATENT OFFICE 2,372,002

TELEMETERING SYSTEM

Frederick G. Kelly, West Orange, N. J., assignor to Thomas A. Edison, Incorporated, West Orange, N. J., a corporation of New Jersey Application March 30, 1943, Serial No. 481,177

7 Claims. (Cl. 171—95)

My invention relates to telemetering or remote indicating systems and is particularly concerned with the provision of an improved receiving instrument for such systems.

It is an object of my invention to provide a telemetering receiving instrument having high sensitivity.

Another object is to provide a telemetering system and a receiving instrument for such a system having a uniform scale calibration.

A further object is to provide a telemetering receiving instrument for fulfilling the aforestated objects which is simple in construction and economical to manufacture.

These and other objects of my invention will be apparent from the following description and the appended claims.

In the description of my invention reference is had to the accompanying drawing, of which:

Figure 1 is a sectional view of a telemetering receiving instrument according to my invention;

Figure 2 is a bottom view of the receiver of Figure 1 as seen from the line 2—2 of that figure;

Figure 3 is a sectional view taken on the line 3—3 of Figure 1;

Figure 4 is a plan view of the pointer and dial of my receiver; and

Figure 5 is a diagrammatic view of a telemetering system into which my invention is incorporated.

In Figure 5 there is shown a conventional telemetering system comprising a transmitting instrument T and a remote receiving instrument R, the two being interconnected by conductors 1. The transmitting instrument, or transmitter, comprises an annular rheostat 2 at the center 3 of which there is journalled a pair of contacts 4. These contacts contact the rheostat at diametrically opposite points, are insulated from one another and are electrically connected through brushes and slip rings 5 to a source of D.-C. potential such as a battery 6. The receiving instrument R comprises a permanent magnet rotor 7 and a plurality of similar coils spaced equidistantly about the rotor pivot axis. In the present example there are three of these coils: 8a, 8b and 8c spaced at 120° intervals. The coils are connected in Y arrangement but may alternatively be connected in delta arrangement. The outer terminals 9a, 9b and 9c of this Y coil arrangement are connected by the aforementioned conductors 1 to respective taps 10a, 10b and 10c provided on the annular rheostat 2, these taps being also equidistantly spaced at 120° intervals.

The operation of this telemetering system is as follows: When the contacts 4 occupy the dotted positions shown in Figure 5, the taps 10b and 10c are at the same potential and no voltage appears across the terminals 9b and 9c of the receiver. There do appear however potential drops of equal magnitude and the same polarity across the rheostat sections from tap 10a to taps 10b and 10c respectively. One of these potential drops is applied across coils 8a and 8b in series, and the other across coils 8b and 8c in series, and the coils produce respective electromagnetic fields. Upon proper phasing of the coils, the fluxes of coils 8b and 8c produce a net magnetic field in phase with the field of coil 8a. The fluxes of the three coils thus combine to produce a resultant magnetic field in the direction of the axis of coil 8a, and the rotor 7 assumes a position in which its magnetic axis is in alignment with this resultant field, as is shown. When the contacts 4 are turned in a clockwise direction from their dotted positions, the total potential drop across coils 8a and 8c decreases but that across coils 8b and 8c increases to cause the direction of the resultant magnetic field of the coils to turn clockwise. For example, when the contacts are turned 60° clockwise from their dotted positions to the position where one of the contacts is at the tap 10c, the resultant magnetic field will be in the direction of the axis of coil 8b and, similarly, when the contacts are turned further clockwise another 60° to place one of the contacts at the tap 10b the resultant magnetic field will be in the direction of the axis of coil 8c. Thus, rotational movements of the contacts 4 of the transmitting instrument cause corresponding indicating movements of the rotor of the receiving instrument. Such a telemetering system has its application in various fields: for example, in transmitting motions from a remote source to an indicating instrument for wind-direction indicating purposes, for transmitting motions from a detecting means on an engine to a control or indicating panel as in airplanes, etc.

The receiving instrument R, with which my invention is particularly concerned, comprises a cylindrical housing 11 made of a conductive material such as of copper. This housing, which is for damping the magnet 7, has a bottom wall 11a and a removable top wall 12, each of which are centrally apertured. Mounted in the aperture of the bottom wall is a jewel 13, and mounted in the aperture of the top wall is an annular jewel 14. In these jewels there is journalled a spindle 15 which projects up through the top wall 12. Mounted on this spindle is the permanent magnet 7 aforementioned. This magnet is composed of a high-coercive-force magnetic material such as that known commercially as Alnico and has its end portions bevelled so that the flux density will be uniform throughout the magnet to produce a maximum external field per unit weight of magnet. Surrounding the copper housing 11 is a tubular shield 17 which is made of a highly permeable magnetic material such as that known as Permalloy. This tubular shield is held between a flange 12a of the top wall 12 and a circular plate 18 that is held by screws 19 to the bottom of the housing, the lower plate 18 having an annular shoulder 20 for localizing the shield in concentric relation to the copper housing. On the periphery of the copper housing 11 are three equidistantly spaced bosses 21. These bosses serve as supports for the respective coils 8a, 8b and 8c.

The receiving instrument R is mounted on a base plate 22 which in turn is secured at 23 to the base of an instrument case 24 made for example of Bakelite. Secured to the base plate 22 are studs 25 which form supports for a dial 26. This dial has a centrally located aperture through which the upper portion of the spindle 15 extends. On this upper portion of the spindle there is mounted a pointer 16 having the usual tailpiece and cross arms 27 and respective balancing weights 28. In the present instance the dial is calibrated for wind-direction indicating purposes as is shown in Figure 4.

In my design of the receiving instrument R, the tubular shield 17 is relied upon not only as a means to shield the magnet 7 from extraneous magnetic fields but also to provide a flux return circuit for the magnet. The flux which returns from one polar end of the magnet to the other by way of this shield is useful flux for it links the coils 8 to produce the torque for driving the rotor system. A characteristic of my design is to have the length of the magnet 7 be a major fraction of the internal diameter of the tubular shield. This has the advantage of reducing the length of air gap between the polar ends of the magnet and the tubular shield, and of increasing the percentage of useful flux relative to the total flux of the magnet. If the magnet is made longer, however, the space between the copper housing 11 and the tubular shield 17 for the coils 8 becomes smaller. I find, however, that a limited coil space may be utilized to maximum advantage by shaping the coils arcuately so as to fill substantially the entire space between the housing and the shield. In such case the magnet may as a practical instance be 65% as long as the internal diameter of the shield, and a very sensitive design of instrument is obtained. For instance, with this design satisfactory driving torque for the rotor system of the receiving instrument is obtained by the expenditure of only .01 watt of power in the telemetering system.

A further important feature in the design of my receiving instrument lies in the configuration of the coils 8 and in the relation between the coils and the magnet. I find, for example, that when the cores of the coils have a width equal approximately to 40% of the over-all width of the coils the resultant flux field of the coils is caused to rotate substantially evenly with the movement of the contacts 4 at the transmitter, and a substantially uniform scale distribution is obtained. Also, significance is had in the relation of the width of the magnet to the width of the cores of the coils, it being important that the effective width of useful magnetic field at the polar ends of the magnets be substantially equal to that of the coil cores. I find further that the use of a relatively wide magnet of the dimensions hereinabove specified is helpful in obtaining a uniform calibration at the points of transition between the coils. In consequence of these design factors, I am enabled to use a uniformly calibrated dial without encountering any substantial error in indication or measurement.

A typical set of dimensions and values for the receiving instrument R may be noted as follows: the tubular shield 17 may be 3/64" thick, 1" high and have an internal diameter of 3/4"; the copper housing 11 may be 1/32" thick, discounting the bosses 21, and the bosses may be each 3/8" high and 3/8" wide; the magnet 7 may be 5/8" long, 1/8" wide and .060" thick at the center; and the coils may each have 1250 turns of Number 40 wire.

The embodiment of my invention herein illustrated and described will be understood to be illustrative and not limitative of my invention since the same may be changed and modified within the range of engineering skill without departing from the scope of my invention, which I endeavor to express according to the following claims. In these claims it will be understood that the limitations set forth are not to be interpreted with a precision or exactness which is undue or unreasonable for the purposes of my invention.

I claim:

1. In an electrical instrument including an annular shield member: the combination of a permanent magnet rotor journalled at the center of said shield member, said rotor having a diametrical length which is a major fraction of the inside diameter of said shield member; and a plurality of coils spaced about said permanent magnet rotor between the rotor and said shield member and having their axes directed toward the axis of rotation of said rotor, said coils being arcuately shaped to fill substantially the space between the magnet rotor and the shield member.

2. In an electrical instrument including an annular shield member: the combination of a permanent magnet rotor journalled at the center of said shield member; and a plurality of coils spaced equidistantly about said permanent magnet rotor each with its axis directed radially to the shield member, and said coils being each arcuately shaped to fill substantially the space between the permanent magnet rotor and the shield member.

3. In an electrical instrument including an annular member of non-permanent magnetic material and a permanent magnet rotor journalled at the center of said member: a plurality of coils having their axes directed radially of said annular member and spaced about the axis of rotation of said motor, each of said coils having a non-magnetic core spanning approximately 40% of the angular distance of over-all span of the coil relative to the pivot axis of said magnet.

4. In an electrical instrument: the combination of a permanent magnet rotor of substantially rectangular cross section in planes normal to its axis of rotation; and a plurality of coils disposed angularly about the path of movement of said magnet, each of said coils having its magnetic axis directed toward the axis of rotation of the magnet, said coils having non-magnetic cores equal substantially in angular width to the effective angular width of the magnet field produced by the polar ends of said magnet.

5. A receiving instrument for a telemetering system comprising an annular shield member; an inner non-magnetic concentric member of conductive material spaced from said shield member; a plurality of coils mounted on said concentric conductive member in the space between the same and said shield member, said coils being spaced equidistantly about the periphery of said concentric conductive member and with their core axes directed radially of said member; and a permanent magnet rotor journalled within said concentric member at the center thereof.

6. A receiving instrument for a telemetering system comprising a hollow cylindrical copper housing; a magnet journalled centrally within said housing; a magnetic shield surrounding said housing and held in concentric relation thereto; and arcuate coils spaced equidistantly about said housing between the housing and said shield member, said housing having projecting peripheral portions on which said coils are mounted.

7. In an electrical measuring instrument: the combination of a hollow cylindrical housing of non-magnetic material having projecting peripheral portions; a magnet journalled centrally within said housing; a magnetic shield surrounding said housing and held in concentric relation thereto; and arcuate coils mounted on said peripheral portions between said housing and said shield member, said coils having their magnetic axes directed toward the axis of rotation of said magnet.

FREDERICK G. KELLY.